May 24, 1932. FOLDING CONTAINER Re. 18,477

Original Filed March 3, 1930 3 Sheets-Sheet 1

INVENTOR.

ISAAC APPELBAUM.

BY Wiedersheim & Fairbanks,

ATTORNEYS.

I. APPELBAUM

FOLDING CONTAINER

May 24, 1932. Re. 18,477

Original Filed March 3, 1930 3 Sheets-Sheet 2

INVENTOR.
ISAAC APPELBAUM.
BY
Wiederhein & Fairbanks
ATTORNEYS.

I. APPELBAUM

May 24, 1932. FOLDING CONTAINER Re. 18,477

Original Filed March 3, 1930 3 Sheets-Sheet 3

INVENTOR.
ISAAC APPELBAUM.
BY
Niederheim & Fairbanks
ATTORNEYS.

Reissued May 24, 1932

Re. 18,477

UNITED STATES PATENT OFFICE

ISAAC APPELBAUM, OF NEW YORK, N. Y., ASSIGNOR TO HANGERETTE FOLDING BOX, LTD., OF NEW YORK, N. Y., A DOMESTIC CORPORATION

FOLDING CONTAINER

Original No. 1,783,068, dated November 25, 1930, Serial No. 432,692, filed March 3, 1930. Application for reissue filed October 10, 1931. Serial No. 568,171.

My invention relates to a new and useful folding container of a novel construction which is durable, inexpensive to manufacture, easy to fold and unfold, and one which affords ample cubic capacity.

My invention further relates to a folding container of this general character which is provided on one end thereof with an integral hanger member with or without a transverse slot therein to the end that men's coats and trousers, women's dresses, as well as other wearing apparel may be supported in a properly folded condition to prevent the rumpling and wrinkling of such wearing apparel within said container.

My invention further relates to a novel folding container of this character which is particularly well adapted for shipping purposes as well as for short distance transportation.

My invention still further relates to a folding container of the general character set forth which may be made from any desirable flexible material such as pasteboard, cardboard, or the like, and which is manufactured by a single stamping operation which involves minimum waste of material and which is fastened and assembled for shipment in the flat unfolded condition, thereby rendering my novel folding containers highly compact and resulting in reducing shipment, storage, and handling expenses to a minimum.

To the above ends, my invention consists of a novel folding container composed of a single integral blank which is provided with two main body portions, connected by an intermediate base of any desired width; side flaps or walls extending along and beyond said main body portions and adapted to be folded inwardly upon said body portions; an end flap or wall on the shorter side of one of said main body portions, said end flap including a reinforcing strip and creased foldable corner portions adapted to form an end wall of a predetermined thickness; a corresponding end flap on the shorter side of the opposite main body portion, said last mentioned end flap including a lateral extension adapted to be folded inwardly to reinforce said end flap; and a hanger integral with and extending from said end flap and adapted to be folded inwardly upon the adjacent main body portion and to lie enclosed within my novel folding container when the latter is assembled.

My invention still further consists in various novel features of construction and assembly whereby the corners of my novel blank are formed and assembled, as well as in various other features of construction and advantage all as hereinafter described and claimed.

For the purpose of illustrating my invention I have shown in the accompanying drawings two forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1:
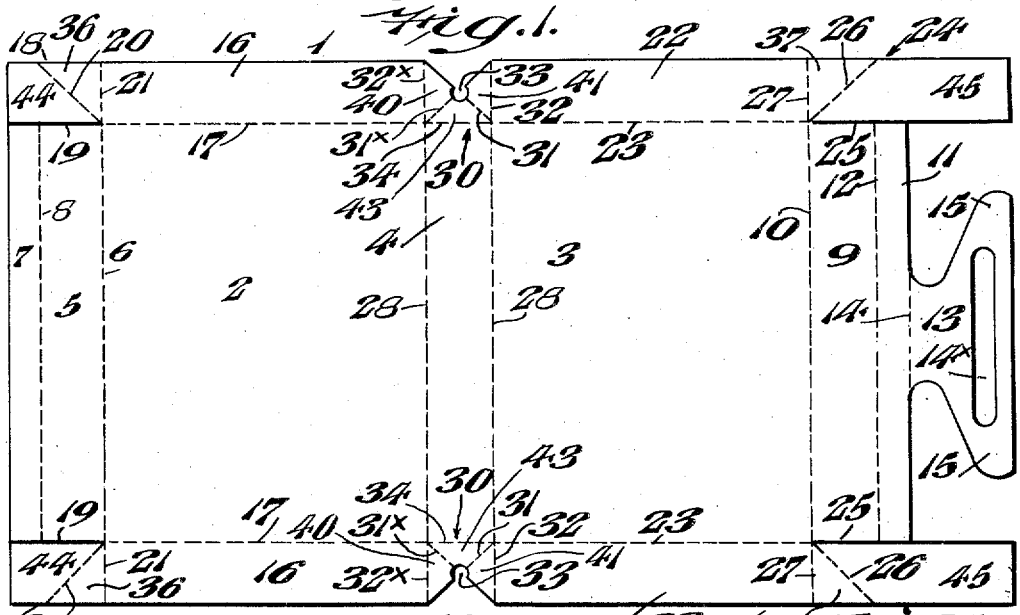
Fig. 1 represents a plan view of a blank from which a novel folding container may be formed, said blank being shown in the unfolded, unassembled position.
Figure 9:
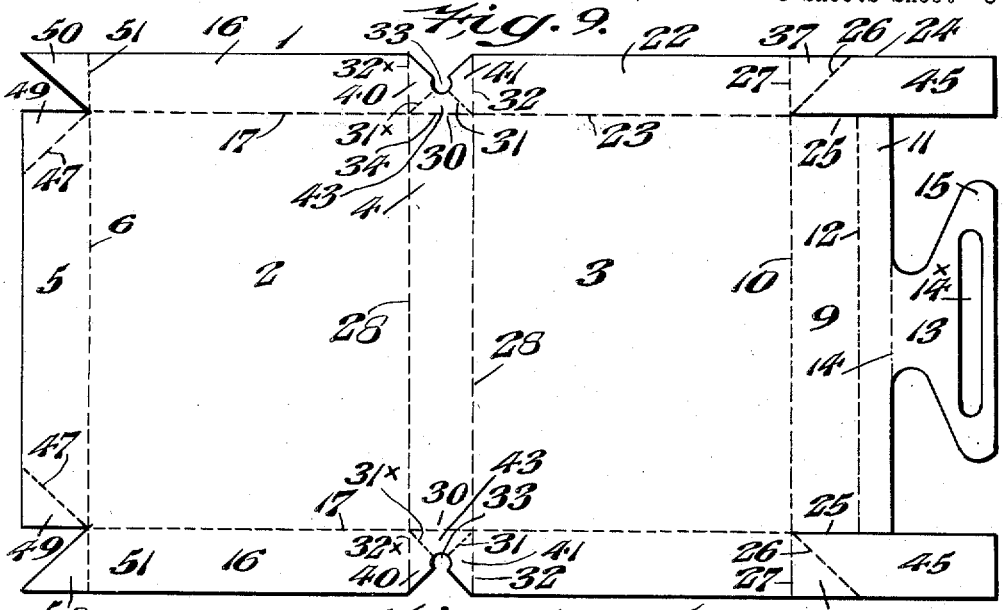

Fig. 9 represents a plan view similar to Fig. 1 illustrating a modified form of my invention.

Figure 2:
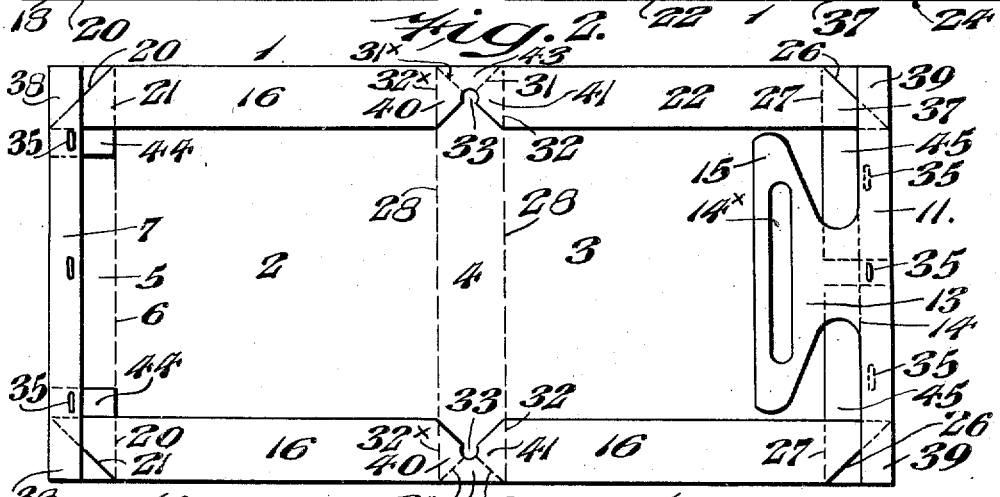
Fig. 2 represents a plan view of my novel folding container when assembled ready for shipment, but before it is erected for actual use.
Figure 3:
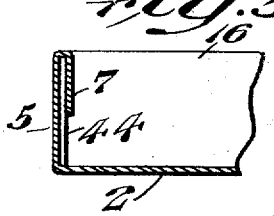
Fig. 3 represents on an enlarged scale a fragmentary sectional view taken on the line 3—3 of Fig. 8.
Figure 4:
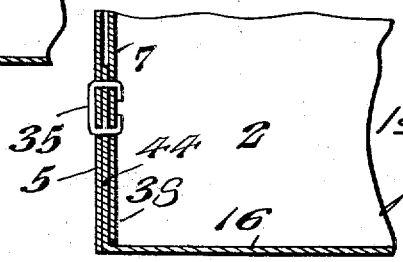
Fig. 4 represents a section on line 4—4 of Fig. 8.
Figure 5:
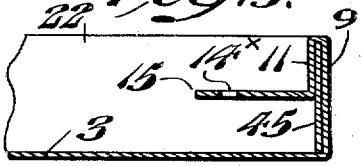
Fig. 5 represents a section on line 5—5 of Fig. 6.
Figure 10:
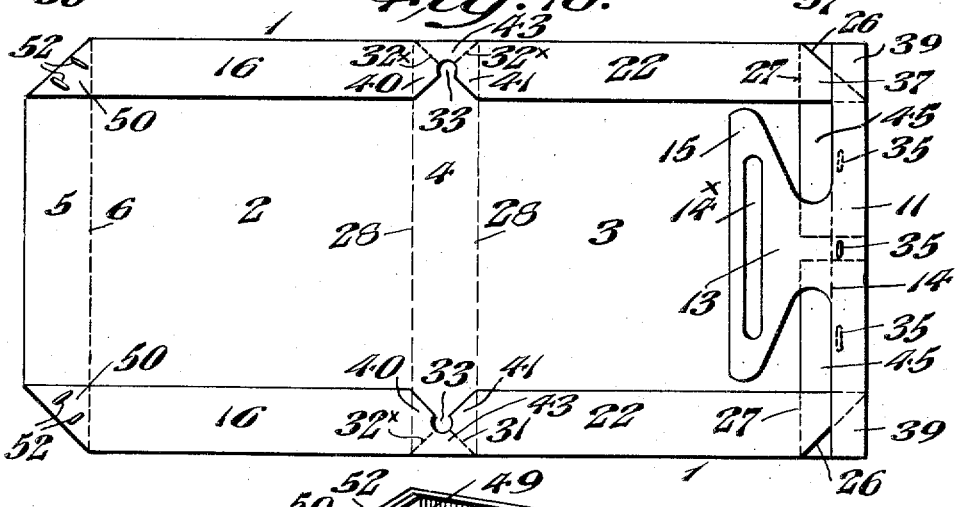

Fig. 10 represents a plan view similar to Fig. 2 illustrating a modified form of my invention.

Figure 11:
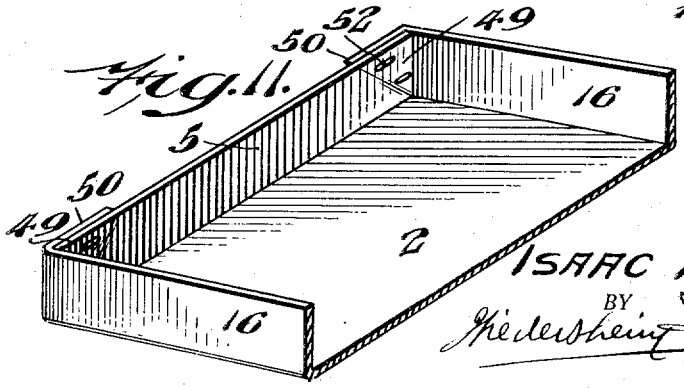

Fig. 11 represents a fragmentary perspective view illustrating the manner of erecting the corners of my novel folding container illustrated in the left hand portion of Figs. 9 and 10.

Referring to the drawings, in which similar numerals of reference indicate corresponding parts, 1 designates a blank from which my novel folding container is made and which comprises the main body portions 2 and 3 and the intermediate base 4. The body portion 2 is provided with the end flap or wall 5 which may be folded with respect thereto along the crease 6. The end flap 5 is provided with the outer reinforcing strip 7 foldable with respect thereto along the crease 8. The body portion 3 is provided with a corresponding end flap 9 which is foldable with respect thereto along the crease 10, and which is provided with the end reinforcing strip 11 which may be folded inwardly along the crease 12. 13 designates a hanger integral with the reinforcing strip 11 and provided at its base with the scoring or crease 14, along which it may be deflected in a manner hereinafter described. The hanger 13 is preferably provided with an elongated slot 14ˣ and with the outer shoulders 15. The outer shoulders 15 of the hanger 13 serve to receive a coat or dress or other garment draped thereon while the elongated slot 14ˣ is adapted to receive other types of garments such as trousers and the like. 16 designates elongated side flaps on either side of the body portion 2 and foldable with respect thereto along the creases 17. The side flaps or walls 16 are provided with the extensions 18 which are severed from the end flap 5 and its reinforcing strip 7 as at 19. The extensions 18 are provided with the diagonal creases 20 hereinafter referred to and are adapted to be folded with respect to the side flaps 16 along the creases or scorings 21. The body portion 3 is provided with the side flaps 22 which may be folded with despect thereto along the creases or scorings 23. The side flaps 22 are provided with the elongated extensions 24 which extend beyond the outer reinforcing strip 11 and which are severed from the end flap 9 and reinforcing strip 11 as at 25. The extensions 24 are provided with the transverse creases 26 and are foldable with respect to the end flap 9 along the scorings or creases 27. The body portions 2 and 3 may be folded with respect to the intermediate base 4 along the creases or scorings 28 when my novel container is being assembled. The base 4 is provided with the end extensions 30 which are disposed intermediate the side flaps 16 and 22, said end extensions being provided with the scorings or creases 31, 31ˣ, 32 and 32ˣ, and with the cut-out portions 33.

In Figure 2 I have illustrated the early steps or stages in the folding and assembly of my novel folding container from the blank shown in Fig. 1, wherein I first fold the end flaps 16 and 22 inwardly upon their respective creases 17 and 23. In this position the end extensions 30 of the intermediate base 4 are also deflected inwardly upon said base along the scoring or crease 34. I then fold the end extensions 18 and 24 inwardly against the end flaps 5 and 9 and their respective end reinforcing strips 7 and 11, along the respective scorings or creases 21 and 27. I next deflect the end reinforcing strips 7 and 11 inwardly against the respective end flaps 5 and 9 and secure the same in position by any suitable means such as the stitches 35 which pass through the reinforcing strips 7 and 11, the end extensions 18 and 24 and end flaps 5 and 9. At this stage of the assembly of my novel folding container it would appear as shown in Fig. 2 and is ready for shipment in bulk in the flat condition shown.

Figure 6:
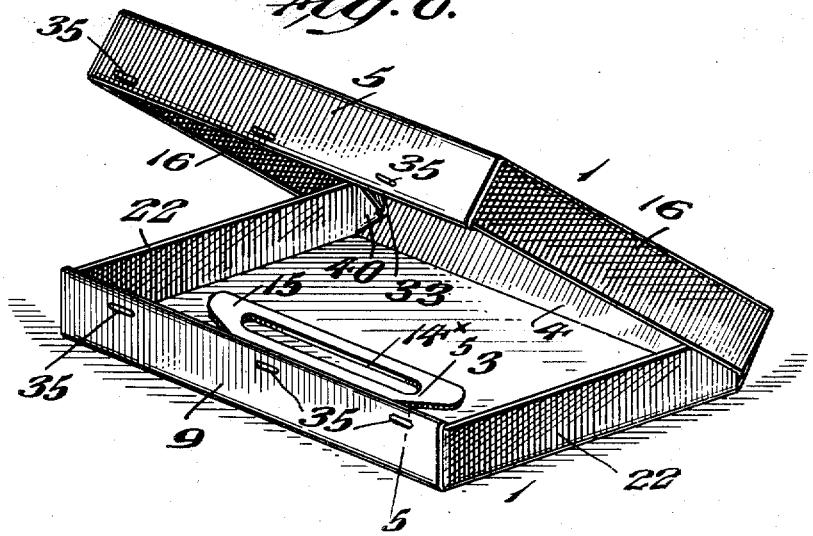
Fig. 6 represents a perspective view of my novel folding container shown in a partly erected or folded condition.
Figure 7:
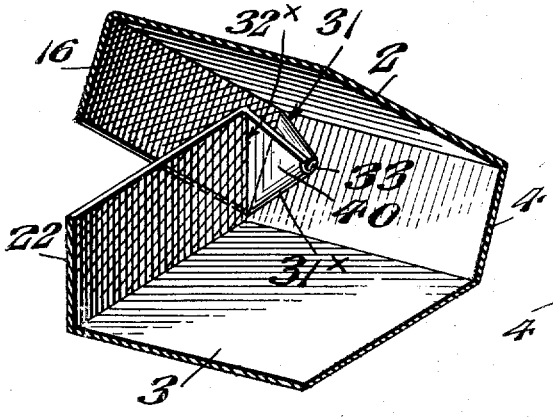
Fig. 7 represents on an enlarged scale a perspective view illustrating the manner of folding the corners at the junction of the main body portions of the blank shown in Fig. 1.
Figure 8:
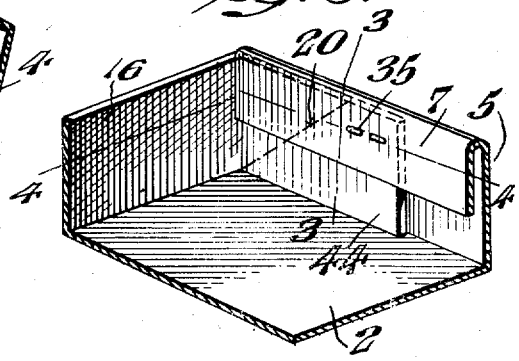
Fig. 8 represents a view similar to Fig. 7 illustrating the manner of folding the corners of my novel container shown at the extreme left hand portion of Fig. 1.

When it is desired to erect my novel container into the position shown in Fig. 6, the end flaps 16 and 22 are raised into a vertical position with respect to the horizontal body portions 2 and 3, and the triangular portions 36 and 37 of the side flaps 16 and 22 are inserted between the unsecured end portions 38 and 39 of the end reinforcing strips 7 and 11 respectively in the manner best illustrated in Fig. 8. The body portions 2 and 3 are then folded towards each other along the scorings or creases 28 (see Fig. 6) whereupon the end extensions 30 of the base 4 are folded along the creases 31, 31ˣ, 32, and 32ˣ, so that the triangular members 40 and 41 are superimposed upon each other and upon the intermediate triangular portion 43 as best illustrated in Fig. 7, thereby producing a reinforced construction. The main body portions 2 and 3 are then brought closer together and the side flaps 22, which in this position form end walls at a right angle to the body portion 3, are now received within the end walls formed by the side flaps 16 which also are at a right angle to the body portion 2, whereby a completely enclosed, greatly reinforced, folding container is produced. It is to be understood that the hanger 13 is deflected inwardly towards the juxtaposed body portion 3 into a position substantially parallel therewith, as best illustrated in Figs. 2 and 6. The triangular portions 44 of the end extensions 18 of the side flaps 16, which are engaged by the stitches 35 in the manner hereinabove set forth, serve to reinforce the corners of which they form part. The elongated portions 45 of the end extensions 24 of the side flaps 22 are of a length the sum total of which approximates the entire length of the end flap 9 and its reinforcing strip 11 so that when said portions 45 are deflected into the proper position and secured by the stitches 35 they constitute a reinforcement not only of the corners of which they are a part but also reinforce the hanger end of the folding container, which is obviously subjected to greater weight and tension along substantially the entire length thereof, as will be best understood from Fig. 2. It will also be noted that by my novel construction the provision of the elongated portions 45 does not involve any increase in the consumption of the material from which the container is made, since said elongated portions 45 are only coextensive with the other edge of the hanger 13. By my novel construction only the cut-out portions intermediate the hanger member and the juxtaposed portions 45 are not used in the making of my folding container, from which it will be seen that I have reduced to an irreducible minimum the amount of waste of material.

To knock down my novel container from the position seen in Fig. 6 to that seen in Fig. 2, it is merely necessary to disengage the triangular portions 36 and 37 of the end extensions 18 and 24 from engagement with the respective unsecured ends 38 and 39 of the reinforcing strips 7 and 11, whereupon the side flaps 16 and 22 automatically lie flat against the juxtaposed body portions 2 and 3, and the hanger member 13, folded along the crease 14, lies flat against the juxtaposed body portion 3.

In Figs. 9, 10, and 11, I have shown a modified form of my invention wherein I employ a different method of fastening the corners on the body portion 2, and since the body portion 3, the base 4, and their adjuncts are identical with the construction disclosed and described in connection with Figs. 1 to 8 inclusive, I deem is unnecessary to describe these parts in further detail and I will confine my description to the construction of the corners seen at the left hand portion, it being understood that it is within the scope of my invention to use this construction in connection with the structure shown in Figs. 1 to 8 inclusive, if so desired. Referring to Figs. 9 and 10, it will be seen that the body portion 2 is provided with an end flap 5 which is provided with the diagonal scorings 47 along which the triangular portions 49 may be deflected inwardly with respect to the end flap 5. It will also be seen that the side flaps 16 are provided with triangular end extensions 50 which are foldable inwardly along the scorings 51. In assembling this construction the end flap 5 is raised into a vertical position with respect to the body portion 2 along the crease 6 and the side flaps 16 are raised into a vertical position with respect to the body portion 2 along the crease 17. The triangular portions 50 are then folded at a right angle to the flap 16 along the creases 51 and in this position they contact with the juxtaposed triangular portions 49 of the end flap 5. Stitches 52 or any other suitable fastening devices may be employed to fasten the trianglar flaps 49 and 50 together in the manner illustrated in Fig. 11. When a folding container of this construction is in the knocked-down or flat condition seen in Fig. 10 the triangular portions 49 and 50 secured by the stitches 52 are folded along the creases 47 and lie flat against the end flap 5. To erect the folding container for use from the position shown in Fig. 10 to that shown in Fig. 11, it is merely necessary to insert the finger under the fastened triangular portions 49—50 and to exert an outward pull. The right hand portions of Figs. 9 and 10, as above stated, are identical in construction with the structure disclosed in Figs. 1 to 8 inclusive and need not be further described.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I claim as new, and desire to secure by Letters Patent, is:

1. A folding box formed of a single blank, comprising juxtaposed body portions and an intermediate base, side and end walls for said body portions, said end walls being folded upon themselves to form reinforcing strips terminating at substantially the mid-height of said end walls, means for fastening said reinforcing strips to said end walls, foldable end extensions for said side walls adapted to form corners for the box, and further to reinforce said end walls, means for securing said extensions to the juxtaposed end portions of said end walls and said reinforcing strips, and a hanger member integral with the edge of one of said reinforcing strips and adapted to extend over and substantially parallel to the adjacent body portion, the end extensions of said side walls being adapted to be retained between the ends of said reinforcing strips and said end walls when the box is in erected condition.

2. A folding box formed of a single blank, comprising juxtaposed body portions and an intermediate base, side and end walls for said body portions, said end walls being folded upon themselves to form reinforcing strips terminating at substantially the mid-height of said end walls, means for fastening said reinforcing strips to said end walls, foldable end extensions for said side walls adapted to form corners for the box, and further to reinforce said end walls, means for securing said extension to the juxtaposed end portions of said end walls and said reinforcing strips, and a hanger member integral with the edge of one of said reinforcing strips and adapted to extend over and substantially parallel to the adjacent body portion, the end extensions of said side walls being adapted to be retained between the ends of said reinforcing strips and said end walls when the box is in erected condition, and said end and side walls and their adjuncts being foldable over said body portions and said base when said box is in the knock-down condition.

3. A box formed of a blank of sheet material comprising a bottom wall, side and end walls hingedly carried by the bottom wall, means associated with at least one end of each side wall and the adjacent ends of an end wall whereby said walls may be secured together, a reinforcing strip extending substantially the entire length of said end wall and lying in contact therewith, means for securing the reinforcing strip to said end wall, and a garment hanger member integral with the edge of said reinforcing strip and adapted to extend relatively closely over and substantially parallel to the bottom of the box.

4. A box of the character described comprising a main body portion including side and end walls, foldable extensions on at least one end of each of said side walls, a reinforcing strip on the end wall adjacent said foldable extensions, means for securing said reinforcing strip to said extensions and said end wall, and a hanger member on the free edge of said reinforcing strip and adapted to extend over and substantialy parallel to the body portion.

5. A box of the class described comprising a main body portion including a bottom with side and end walls hinged thereto, a reinforcing strip integral with the edge of one of the end walls, means for securing said reinforcing strip to said end wall, said strip extending along a major portion of the length of the end wall whereby to effectively resist bending thereof, and a garment hanger member integral with the edge of said reinforcing strip and adapted to extend over and substantially parallel to the adjacent main body portion.

6. A box of the class described comprising a main body portion including side and end walls, a reinforcing strip integral and substantially coextensive with the edge of one of the end walls, a garment hanger member integral with the edge of said reinforcing strip and adapted to extend over and substantially parallel to the adjacent main body portion, and means for securing said reinforcing strip to the inner face of said end wall whereby the stresses exerted on said hanger member by a garment will be distributed along substantially the entire length of said end wall.

7. A box formed of a blank of sheet material comprising bottom and top portions having side and end walls formed integral therewith, foldable extensions on at least one end of each of said side walls adapted to be folded to lie against the adjacent end wall, a reinforcing strip on one of said end walls adjacent said foldable extensions and extending substantially the entire length of said end wall, said extension being bent over to lie adjacent said end wall and said foldable extensions, means for securing said reinforcing strip to said end wall and said foldable extensions, and a garment hanger member secured to said reinforcing strip and adapted to extend over and substantially parallel to the bottom of the box.

8. A suit box comprising a main body portion including a top and bottom, side and end walls on the bottom which are relatively narrow as compared to the extent of said bottom, one of said end walls lying flush with and entirely closing an end of said box, a reinforcing strip integral with the edge of one of said end walls remote from the juncture of said end wall with the main body portion, means for securing said reinforcing strip to said end wall, said strip extending along a major portion of the length of the end wall whereby said wall effectively resists bending thereof by reason of stresses imposed thereon substantially at right angles to the plane of said end wall, and a garment hanger member secured to said reinforcing strip and adapted to extend over and substantially parallel to the adjacent box bottom so as to support a garment in a plane substantially parallel thereto.

9. A suit box comprising a main body portion including side and end walls which are relatively narrow as compared to the extent of said main body portion, a reinforcing strip integral with and extending along a major portion of the edge of an end wall remote from and substantially parallel to the juncture of said end wall with the main body portion, a garment hanger member integral with the edge of said reinforcing strip and adapted to extend over and substantially parallel to the adjacent main body portion, and means for securing said reinforcing strip to the inner face of said end wall whereby the stresses exerted on said hanger member by a garment will be distributed along substantially a major portion of the length of said end wall.

10. A suit box comprising a main body portion carrying side and end walls which are relatively narrow as compared to the extent of said main body portion, a reinforcing strip extending along a major portion of the length of an end wall, a garment hanger member integral with the reinforcing strip and extending relatively closely over and substantially parallel to the adjacent main body portion, and means for securing the reinforcing strip to the inner face of said end wall whereby the stresses exerted on the hanger member by a garment will be distributed along substantially a major portion of the length of said end wall.

ISAAC APPELBAUM.